United States Patent
Baik et al.

(10) Patent No.: US 8,457,205 B2
(45) Date of Patent: Jun. 4, 2013

(54) APPARATUS AND METHOD OF UP-CONVERTING FRAME RATE OF DECODED FRAME

(75) Inventors: Aron Baik, Yongin-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1163 days.

(21) Appl. No.: 11/946,203

(22) Filed: Nov. 28, 2007

(65) Prior Publication Data

US 2008/0187048 A1    Aug. 7, 2008

(30) Foreign Application Priority Data

Feb. 2, 2007   (KR) ................................ 2007-11197

(51) Int. Cl.
*H04N 7/26*   (2006.01)
(52) U.S. Cl.
USPC .................................................. 375/240.16
(58) Field of Classification Search
None
See application file for complete search history.

(56) References Cited

U.S. PATENT DOCUMENTS

| | | | |
|---|---|---|---|
| 5,731,849 A * | 3/1998 | Kondo et al. ................. | 348/699 |
| 6,192,079 B1 * | 2/2001 | Sharma et al. ........... | 375/240.16 |
| 2004/0136461 A1 * | 7/2004 | Kondo et al. ............ | 375/240.16 |
| 2006/0012719 A1 * | 1/2006 | Karczewicz et al. ......... | 348/699 |
| 2006/0126952 A1 * | 6/2006 | Suzuki et al. ................. | 382/233 |
| 2006/0245497 A1 * | 11/2006 | Tourapis et al. ......... | 375/240.16 |
| 2007/0064810 A1 * | 3/2007 | Miao et al. ............... | 375/240.24 |

FOREIGN PATENT DOCUMENTS

| | | |
|---|---|---|
| KR | 2003-33851 | 5/2003 |
| KR | 2003-69277 | 8/2003 |
| KR | 2005-62835 | 6/2005 |
| WO | WO 2006/012382 | 2/2006 |

* cited by examiner

*Primary Examiner* — Gregory Sefcheck
*Assistant Examiner* — Steve Young
(74) *Attorney, Agent, or Firm* — Staas & Halsey LLP

(57) ABSTRACT

An apparatus and method of up-converting a frame rate using frames that are decoded from a video decoder and motion information, the apparatus including: a motion vector resampling unit to resample a motion vector for the interpolated frame by filtering a motion vector of a current block using the motion vector of the current block and motion vectors of adjacent blocks in the decoded frame; a motion compensating unit to compensate a motion of the decoded frame by the resampled motion vector to produce the interpolated frame; and a switch to selectively output one of the decoded frame and the interpolated frame according to the sequential order of the frames.

23 Claims, 9 Drawing Sheets

| | | | | |
|---|---|---|---|---|
| SIZE OF CURRENT BLOCK | 16x16 | 8x16 | 16x8 | 8x8 |
| CURRENT INTERPOLATED FRAME |  |  |  |  |
| PRIOR INTERPOLATED FRAME |  |  |  |  |

FIG. 10

| KIND AND SIZE OF BLOCK | PREDICTIVE CODED BLOCK | | | INTRA-CODED BLOCK |
|---|---|---|---|---|
| | 16×16 | 8×16, 16×8 | 8×8 | |
| WEIGHT ($w_B$) | 1.0 | 0.7 | 0.5 | 0 |

APPARATUS AND METHOD OF UP-CONVERTING FRAME RATE OF DECODED FRAME

CROSS-REFERENCE TO RELATED APPLICATION

This application claims the benefit of Korean Application No. 2007-11197, filed on Feb. 2, 2007 in the Korean Intellectual Property Office, the disclosure of which is incorporated herein by reference.

BACKGROUND OF THE INVENTION

1. Field of the Invention

Aspects of the present invention relate to a video coding technology, and in particular, to an apparatus and method of up-converting a frame rate using frames that are decoded from a video decoder and motion information.

2. Description of the Related Art

With the development of information and communication technologies along with the Internet, video communications, short message communications, and voice communications are increasing. However, the conventional short message centered communication methods are insufficient for the diverse needs of customers. Accordingly, multimedia services that can accommodate diverse features of short messages, images, music, etc. are increasingly provided. However, the volume of multimedia data is so immense that mass storage devices and broader bandwidths for data transmission are required. Therefore, in order to transmit multimedia data that include short messages, images, and audio data, a code compression technique is used.

The basic principle of data compression is to eliminate data redundancy. Data can be compressed by eliminating spatial redundancy (such as the repetition of the same color or object), time redundancy (such as when adjacent frames change little in a moving image frame or a same tone is repeated in an audio file); and visual redundancy (which takes into consideration the fact that human beings' vision and perception are not sensitive to high frequency). In a generally known video coding method, time redundancy in video data is eliminated by temporal filtering based on motion compensation, and spatial redundancy is eliminated by spatial transformation.

The resulting video data in which redundancy has been eliminated is lossily compressed according to a quantization process. Finally, the quantized data undergoes entropy coding to be losslessly compressed.

Such video data compressing technique is employed in a variety of devices ranging from large-volume data processing devices (such as digital TVs, DVD players, etc.) to mobile devices for relatively small-volume data processing (such as mobile phones, PDAs (Personal Digital Assistants), digital camcorders, etc.).

In general, as these mobile devices are provided with insufficient data storage space, network communication bandwidth, and data processing capacity, the resolution and frame rate of video data used in these mobile devices tend to be relatively low. Consequently, video images having a low frame rate may look more unnatural to a user when generated on a Liquid Crystal Display (LCD) panel provided in a mobile device.

In order to overcome this problem, a frame rate up conversion technique has been proposed for coded videos. Such a conversion improves a frame rate of a video coded in a specific frame rate. For example, as shown in FIG. 1, if the frame rate of the original frame (the frame of a coded video) is 15 Hz, a video frame having a frame rate of 30 Hz in total can be obtained by adding interpolated frames into each frame. In this case, a method of obtaining interpolated frames from the original frame is a critical issue. However, if interpolated frames are obtained through additional motion estimation (as in an encoder), a substantial amount of calculation is required and is, thus, not suitable for playing the video in a mobile device.

Therefore, it is necessary to realize a frame rate up-conversion without an additional motion estimation process by using motion vectors already included in the coded video.

SUMMARY OF THE INVENTION

Aspects of the present invention provide a method of efficiently performing up-conversion of a frame rate by resampling a motion vector that is similar to the true motion from a decoded motion vector.

According to an aspect of the present invention, there is provided an apparatus for up-converting a frame rate of a decoded frame of a video stream by producing an interpolated frame using motion information from the video stream, the apparatus including: a motion vector resampling unit to resample a motion vector for the interpolated frame by filtering a motion vector of a current block of the decoded frame using the motion information; a motion compensating unit to compensate a motion of the decoded frame by the resampled motion vector in order to produce the interpolated frame; and a switch to selectively output one of the decoded frame and the interpolated frame according to a sequential order of the frames.

According to another aspect of the present invention, there is provided a method of up-converting a frame rate of a decoded frame of a video stream by producing an interpolated frame using motion information from the video stream, the method including: resampling a motion vector for the interpolated frame by filtering a motion vector of a current block of the decoded frame using the motion information; compensating a motion of the decoded frame by the resampled motion vector in order to produce the interpolated frame; and selectively outputting one of the decoded frame and the interpolated frame according to a sequential order of the frames.

According to yet another aspect of the present invention, there is provided an apparatus for resampling a motion vector of a decoded frame of a video stream used to compensate a motion of the decoded frame in order to produce an interpolated frame for up-converting a frame rate of the decoded frame, the apparatus including: a motion vector calculating unit to resample the motion vector by filtering a motion vector of a current block of the decoded frame using the motion vector of the current block and motion vectors of adjacent blocks of the current block in the decoded frame.

According to still another aspect of the present invention, there is provided a method of resampling a motion vector of a decoded frame of a video stream used to compensate a motion of the decoded frame in order to produce an interpolated frame for up-converting a frame rate of the decoded frame, the method including: resampling the motion vector by filtering a motion vector of a current block of the decoded frame using the motion vector of the current block and motion vectors of adjacent blocks of the current block in the decoded frame.

According to another aspect of the present invention, there is provided an apparatus for up-converting a frame rate of a video stream by producing an interpolated frame using motion information from the video stream, the apparatus including: a decoder to decode a frame of the video stream and the motion information from the video stream; a motion vector resampling unit to resample a motion vector for the interpolated frame by filtering a motion vector of a current block of the decoded frame using the motion information; a motion compensating unit to compensate a motion of the decoded frame by the resampled motion vector in order to produce the interpolated frame; and a switch to selectively output one of the decoded frame and the interpolated frame according to a sequential order of the decoded frame and the interpolated frame.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 10 is a diagram illustrating an example of allocating a weight during a filtering process according to an embodiment of the present invention;

DETAILED DESCRIPTION OF THE EMBODIMENTS

Figure 1:
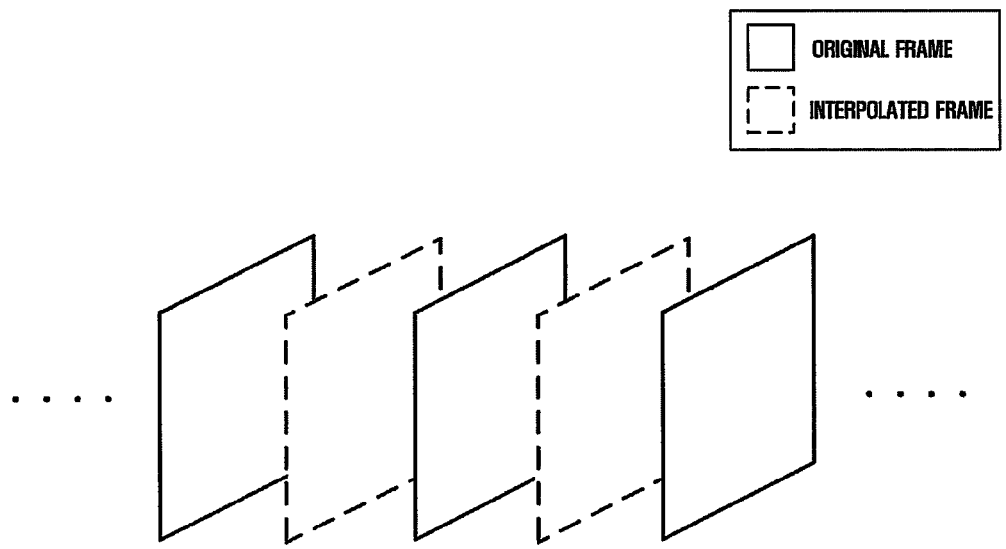
FIG. 1 is a diagram illustrating an up-sampling of a frame rate.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
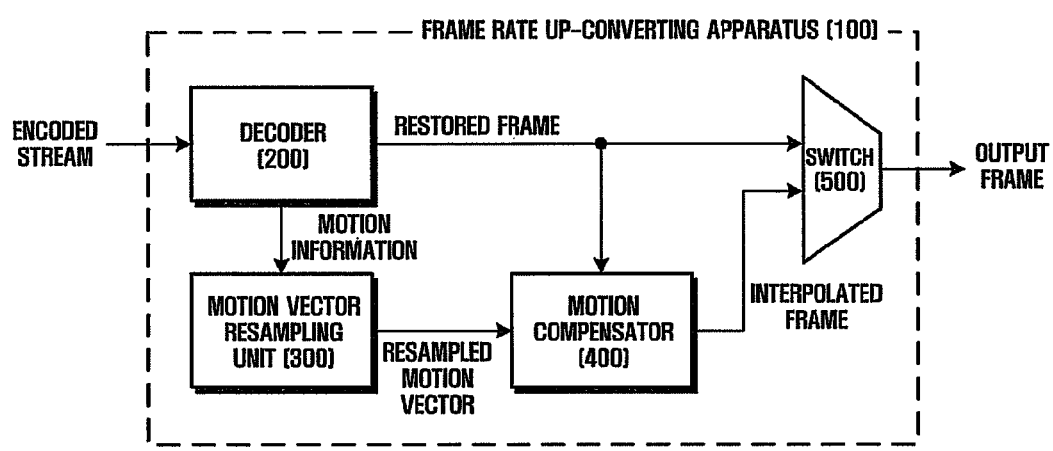
FIG. 2 is a block diagram illustrating a structure of a frame rate up-converting apparatus according to an embodiment of the present invention.

FIG. 2 is a block diagram illustrating a structure of a frame rate up-converting apparatus 100 according to an embodiment of the present invention. The up-converting apparatus 100 includes a decoder 200, a motion vector resampling unit 300, a motion compensator 400, and a switch 500.

Figure 3:
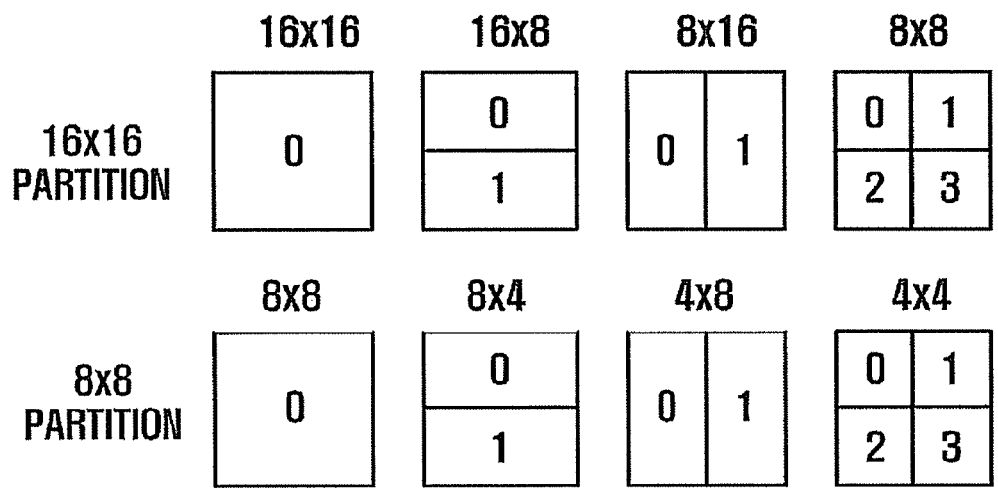
FIG. 3 is a diagram illustrating examples of variable blocks having different sizes according to H.264.

The decoder 200 decodes a frame and motion information from an encoded video stream (hereinafter, referred to as an encoded stream). In this specification, the motion information includes at least one of motion vectors that are allocated for every block, a type of blocks, block partition information, reference frame offsets, etc. The type of blocks indicates whether a block is obtained by temporal prediction (hereinafter, referred to as a predictive block) or without the temporal prediction (hereinafter, referred to as an intra block). The block partition information relates to a size of the block having a variable size that is used in H.264, according to a block matching algorithm. Referring to FIG. 3, the blocks to which motion vectors are allocated have various pixel sizes (such as 16×16, 16×8, 8×16, 8×8, 8×4, 4×8, and 4×4).

Figure 4:
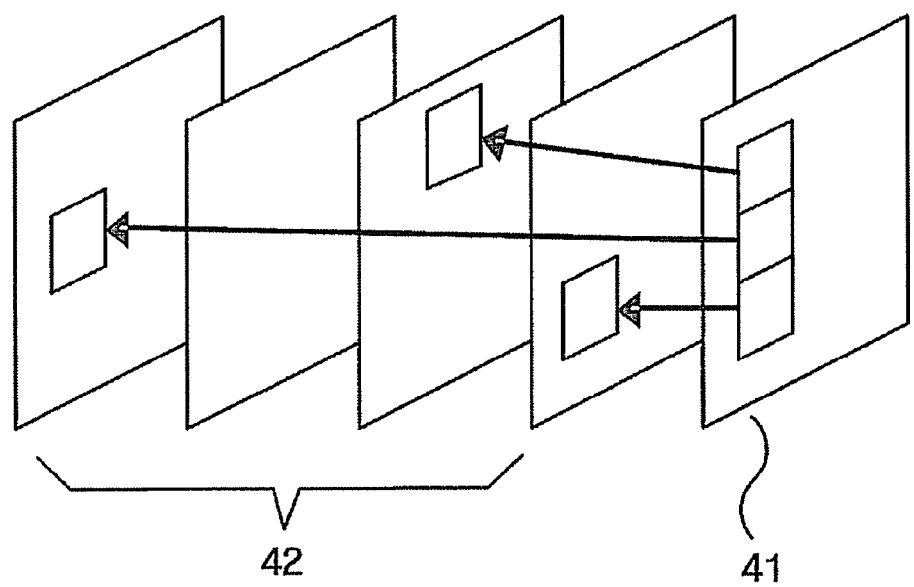
FIG. 4 is a diagram illustrating a multiple frame reference.

FIG. 4 is a diagram illustrating a multiple frame reference. H.264 standard allows a block in a current frame 41 to refer to other frames 42 disposed prior to the current frame 41. In this case, the reference frame offset of the four frames 42 may have a value within 4 to 1 according to a distance from the current frame 41 (the offset increases as the distance becomes larger). The current frame 41 includes a predictive-coding block that uses a motion vector and an intra-coding block that does not use the motion vector. Therefore, all blocks in the current frame 41 do not have motion vectors.

Figure 5:
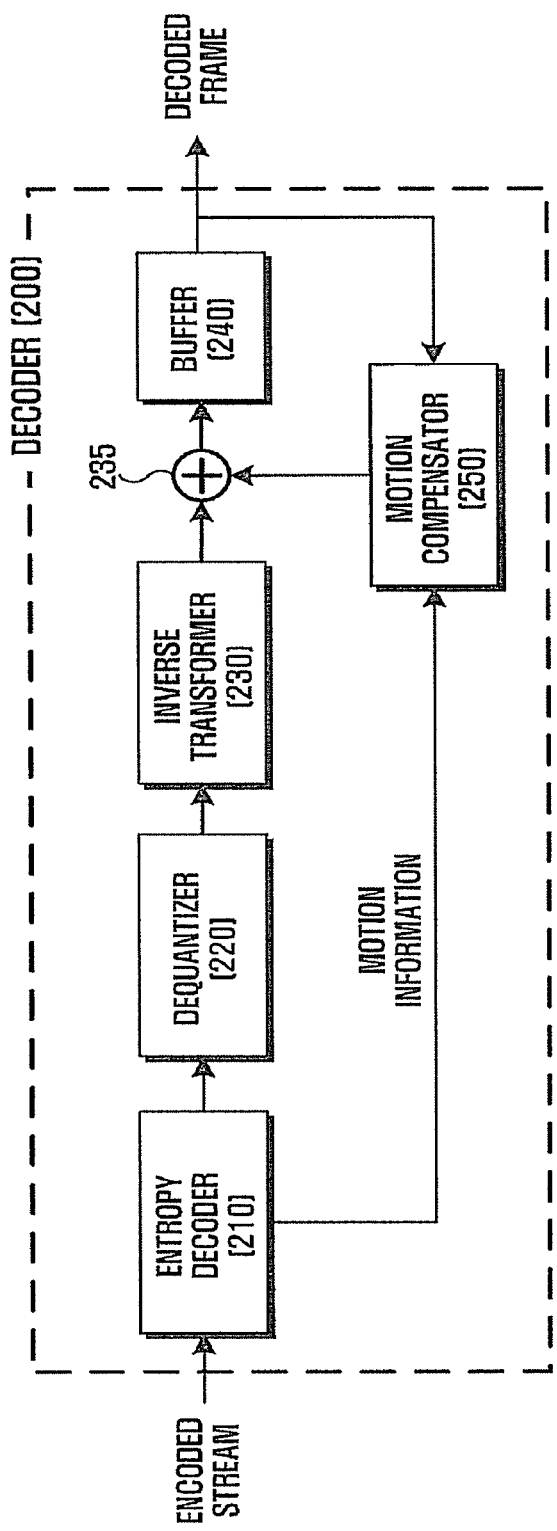
FIG. 5 is a block diagram illustrating a structure of a decoder according to an embodiment of the present invention.

FIG. 5 is a block diagram illustrating a structure of a decoder 200 according to an embodiment of the present invention. Referring to FIG. 5, the decoder 200 includes an entropy decoder 210, a dequantizer 220, an inverse transformer 230, an adder 235, a buffer 240, and a motion compensator 250. The entropy decoder 210 performs lossless decoding to extract motion information and coded residual information from the encoded stream. Various decoding techniques (such as variable length decoding, arithmetic decoding, and Hoffmann decoding) may be used for the lossless decoding. The extracted residual information is supplied to the dequantizer 220 and the motion information is supplied to the motion compensator 250.

The dequantizer 220 de-quantizes the residual information provided by the entropy decoder 210. Specifically, the dequantizer 220 restores a value that is matched to the residual information from an index produced (or provided) in the dequantizing process using a same quantization table as a table used in the quantizing process.

The inverse transformer 230 inversely transforms the dequantized result. Specifically, the inverse transformer 230 inversely performs the transforming process in the encoder stage by using inverse DCT transformation, inverse wavelet transformation, etc. The restored residual signal that is a result of the inverse transformation is supplied to the adder 235.

The motion compensator 250 compensates a motion of a reference frame (that is restored to be stored in the buffer 240) for the current frame using motion information provided by the entropy decoder 210 to produce a predictive signal.

The adder 235 adds the restored residual information provided by the inverse transformer 230 and the produced predictive signal to restore the current frame. The restored current frame is temporally stored in the buffer 240, and is used to restore different frames.

Referring to FIG. 2 again, the motion information provided by the entropy decoder 210 of the decoder 200 is supplied to the motion vector resampling unit 300. Furthermore, the frame that is restored by the decoder 200 is supplied to the motion compensator 400 and the switch 500.

The motion vector resampling unit 300 resamples the motion vector to produce an interpolated frame using the motion information provided by the decoder 200, and supplies the resampled motion vector to the motion compensator 400. The operation of the motion vector resampling unit 300 according to an embodiment of the present invention will be described in more detail below with reference to FIG. 6.

The motion compensator 400 uses the resampled motion vector (and the other motion information) as an input to perform motion-compensation of the restored frame in advance to produce the interpolated frame.

The switch 500 selectively outputs one of the decoded frame that is provided by the decoder 200 and the interpolated frame provided by the motion compensator 400 according to a sequential order in order to perform the frame rate up-converting. The decoder 200, the motion vector resampling unit 300, and/or the motion compensator 400 may include a buffer that is used to store motions of multiple frames.

Figure 6:
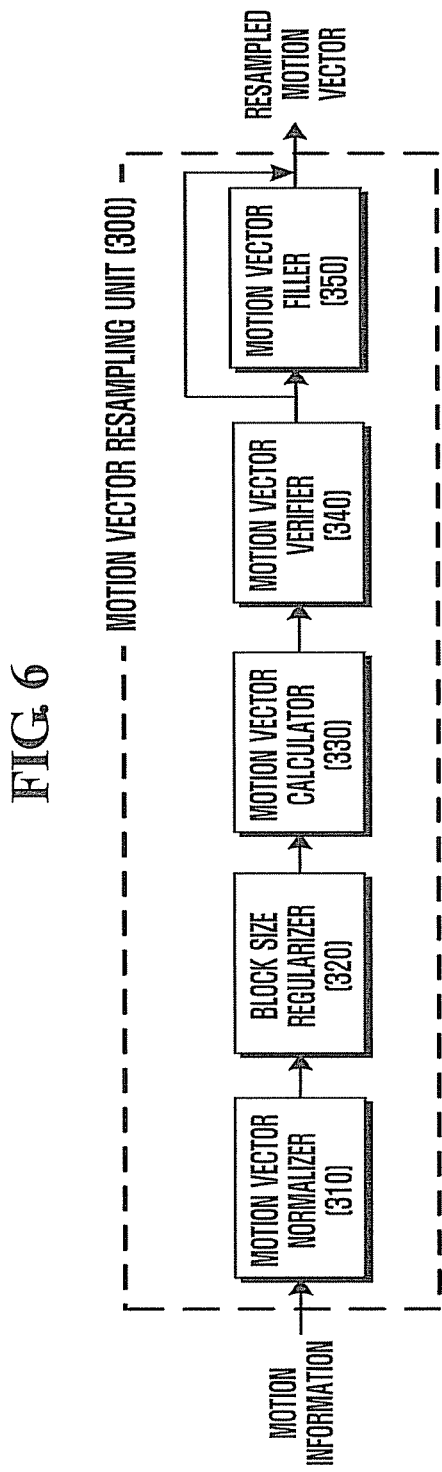
FIG. 6 is a block diagram illustrating a structure of a motion vector resampling unit according to an embodiment of the present invention in detail.

FIG. 6 is a block diagram illustrating a structure of the motion vector resampling unit 300 of FIG. 2 in detail. The motion vector resampling unit 300 includes a motion vector normalizer 310, a block size regularizer 320, a motion vector calculator 330, a motion vector verifier 340, and a motion vector filler 350.

Generally, since a video encoder searches for a motion vector that produces a minimum motion-compensated residual value for a minimum code size, an obtained motion vector may be different from a motion of an actual object. Furthermore, since the motion vector may refer to different preceding reference frames, it is important to normalize the size of the motion vector.

The motion vector normalizer 310 normalizes the motion vector according to a reference distance (temporal distance between the current frame and the reference frame) of the motion vector provided by the decoder 200. For example, the motion vector normalizer 310 normalizes the motion vector by using an operation that divides the motion vector by the reference frame offset. The reference frame offset may be stored in a buffer (not shown) in order to be used for the motion vector calculation later.

The block size regularizer 320 regularizes the blocks having various sizes to which the motion vectors are allocated to blocks having a predetermined size or larger. The regularization combines blocks having a size smaller than a predetermined block size as a representative block having the normalized block size. However, it is understood that, according to aspects of the present invention, the combining process may be omitted (such as when the size of blocks to which motion vectors provided by the decoder 200 are allocated is fixed to have the normalized block size or smaller).

In an advanced video coding technique (such as H.264), in order to obtain the minimum coding size, variable block size motion compensation in which the block sizes are varied is used as shown in FIG. 3. For example, as shown in FIG. 3, the macro blocks may be partitioned to have various block sizes ranging from 16×16 to 4×4.

In order to perform the motion compensation after motion vector resampling, motion vectors that are allocated to blocks having the same size may be obtained, and it is important to reflect the true motion of actual video objects in the resampled motion vector.

Figure 7:
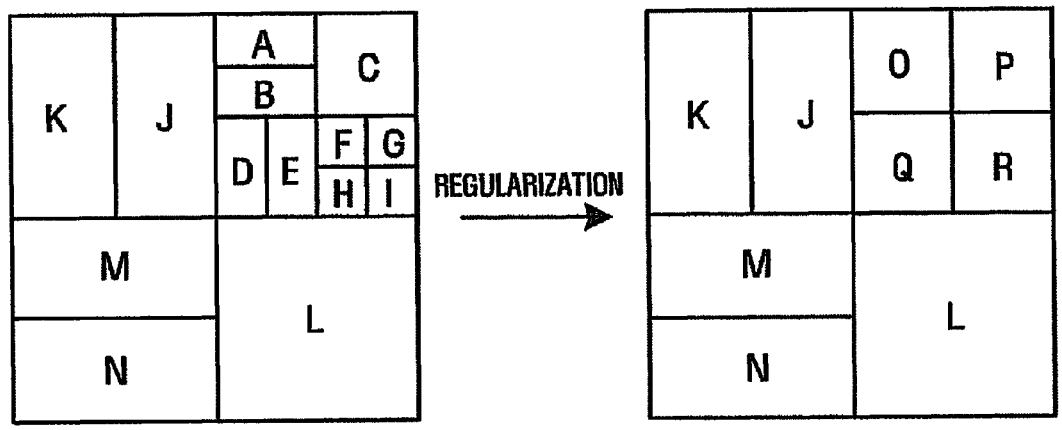
FIG. 7 is a diagram illustrating an example of block size regularization.

FIG. 7 illustrates an example of block size regularization. Blocks before regularization on the left side of FIG. 7 have various sizes. Here, the smallest sized blocks F, G, H, and I have 4×4 pixels, and the largest sized block L has 16×16 pixels. In contrast, the regularized blocks on the right side of FIG. 7 have a predetermined block size or larger (for example, 8×8 pixels or more).

In FIG. 7, the blocks having a smaller size than the regularized block size (for example, 8×8 pixels) are regularized to a single representative block having the regularized block size. The blocks are regularized because a motion vector having a small block size has a smaller number of reference pixels and, therefore, the true motion is insufficiently reflected thereto as compared with the motion vector having a large block size. For example, the blocks A and B before regularization are regularized to a representative block O, the blocks D and E are regularized to a representative block Q, and the blocks F, G, H and I are regularized to a representative block R.

There are various operations to obtain a single motion vector that is applied to a regularized block (representative block) from the motion vectors of a plurality of blocks. For example, a vector median operation may be used. The vector median operation will be described in more detail below in the description of the operation of the motion vector calculator 330. However, in this case, since the representative block O or Q includes two blocks, the vector median thereof cannot be calculated. Therefore, a motion vector having a smaller size may be selected from motion vectors of blocks included in the corresponding representative block as a motion vector of the representative block. The motion vector having the smaller size may be selected because if the size of motion vector is small, the possibility of approaching the true motion is increased.

Figure 8:
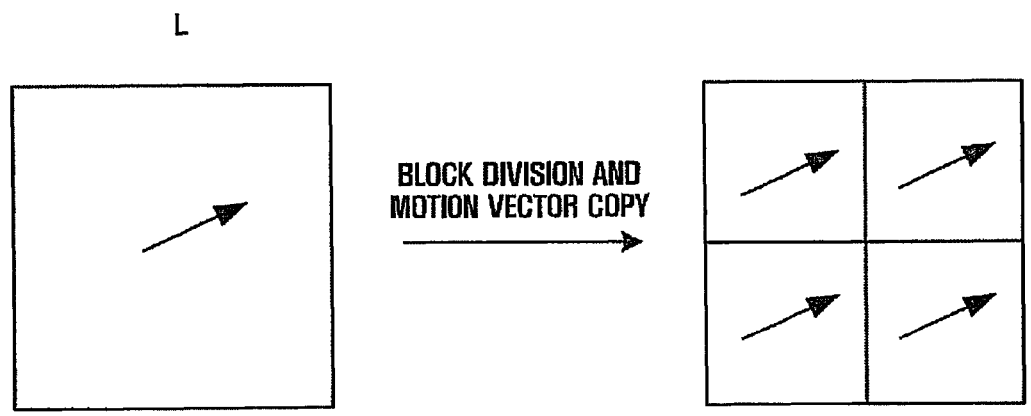
FIG. 8 is a diagram illustrating an example of dividing a block having a larger size than a regularized block into blocks having a regularized block size.

The blocks K, J, M, N, and L having 8×8 pixels or more may not be regularized (i.e., may not change sizes). This is because if the motion compensation for a block having a constant size of 8×8 pixels is required in the motion compensator 400, the blocks K, J, M, N and L may be changed to have the size of 8×8 pixels at any time. As shown in FIG. 8, the block L having the size of 16×16 pixels is divided into four blocks having the size of 8×8 pixels, and motion vectors are allocated to the divided blocks. The motion vectors that are allocated to the divided blocks are the same as the original motion vector of the block L.

The motion vector calculator 330 calculates the motion vector of the current block by referring to the motion vector of the regularized current block and the motion vectors of the adjacent blocks. The motion vector calculation is a filtering operation to obtain a motion vector that approaches the true motion referring to adjacent motion vectors in the spatial or temporal region.

The motion vector calculating process includes selecting blocks that relate to the filtering operation (hereinafter, referred to as evaluation blocks), allocating weights to the blocks according to the types of the blocks, and obtaining the motion vector using a predetermined operation in which the weights are reflected.

Figure 9:
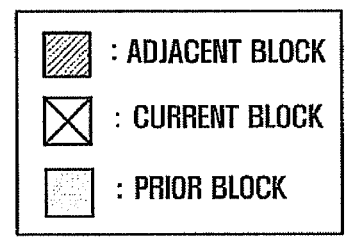
FIG. 9 is a diagram illustrating an example of selecting blocks that are used to evaluate a vector median operation.
Figure 9:
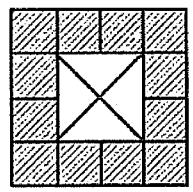
Figure 9:
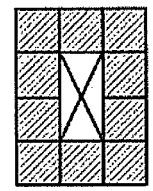
Figure 9:
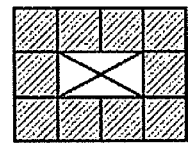
Figure 9:
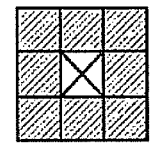
Figure 9:
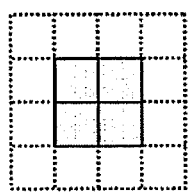
Figure 9:
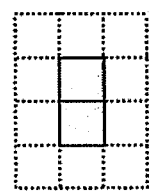
Figure 9:
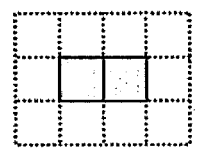
Figure 9:
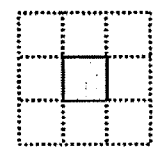

The selecting of evaluation blocks will now be described with reference to FIG. 9. A block to which the filtering operation is applied (hereinafter, referred to as a current block) is represented by "X." In the embodiment of the present invention, the evaluation blocks include the current block and the blocks that are adjacent to the current block (hereinafter, referred to as adjacent blocks). In another embodiment of the present invention, in addition to the current interpolated frame, interpolated frames prior to the current interpolated frame may be considered. In the example of FIG. 9, the evaluation blocks include blocks that are disposed in the corresponding position to the current block of a prior interpolated frame (hereinafter, referred to as a prior block) in addition to the current block of the current interpolated frame and the adjacent blocks of the current block in the current interpolated frame.

The motion vectors of the current block and the adjacent blocks are candidate motion vectors that have a possibility of being a filtered motion vector through a specific operation (for example, vector median operation). The prior blocks may be used only for evaluation in the operation, and are not selected as the candidate motion vectors. However, it is understood that, according to other aspects of the present invention, the prior blocks may also be used as the candidate motion vectors.

In the current interpolated frame of FIG. 9, the region that provides the candidate motion vectors is defined as a kernel. In the embodiment shown in FIG. 9, it is understood that because the size of adjacent blocks vary according to the size of the current block, the size of the kernel also varies.

The allocating of weights during the filtering process will now be described with reference to FIG. 10. In the filtering process, instead of dividing the block having a size that exceeds the regularized block size into the regularized block size, weights are applied depending on the block size. For example, a block having 16×16 pixels can be divided into four regularized blocks (having 8×8 pixels). However, in this case, the motion vectors of the divided blocks are equal to each other, and if the vector median is applied thereto, the possibility that the motion vector of the divided block is selected as the filtered motion vector is increased. Therefore, if the object of the filtering process is to search for the motion vector most similar to the true motion by considering the adjacent blocks or prior blocks, this process may be purposeless.

However, in this regard, since the motion vector of a large block is relatively important as compared with the motion vector of a small block, the different weights may be applied to the vector median operation depending on the block size. FIG. 10 shows the sizes of evaluation blocks. Referring to FIG. 10, different weights are set depending on the sizes and types of evaluation blocks. As shown in FIG. 10, the intra-coded block does not have any motion vector, the weight thereof is 0. The predictive coded block has a weight that is increased according to the block size. However, the specific weight value may be arbitrarily selected by those skilled in the art.

Figure 11:
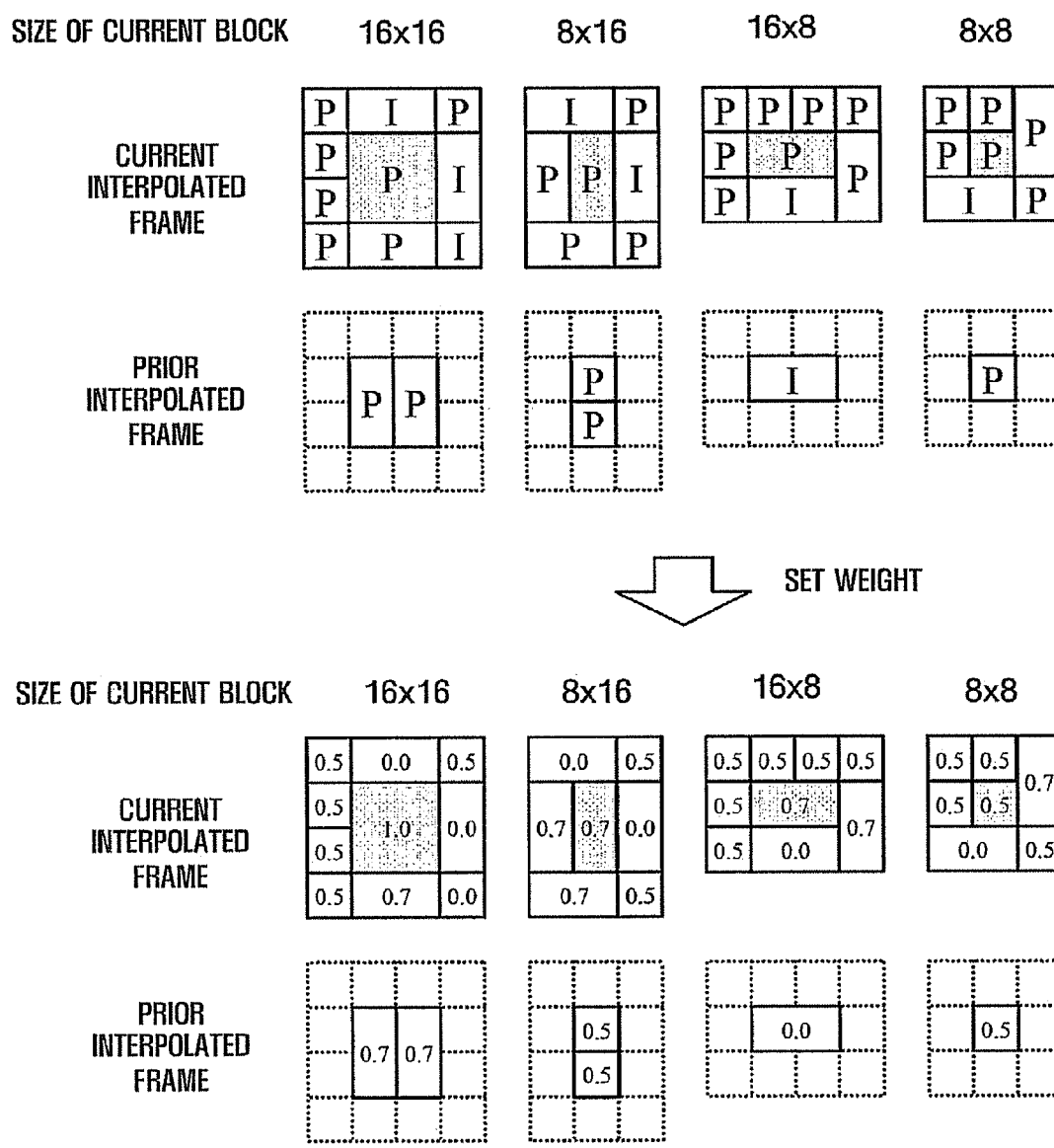
FIG. 11 is a diagram illustrating an example in which different weights are set depending on a type and size of blocks for evaluation.

FIG. 11 illustrates an example of different weights that are set depending on the types and sizes of the evaluation blocks. In FIG. 11, reference character P denotes a predictive coded block, and reference character I denotes an intra-coded block.

In the current interpolated frame, the maximum number of adjacent blocks is twelve according to the number of predictive coded blocks. In the example where the block size is 16×16 pixels, seven candidate motion vectors are present in the current interpolated frame (in this case, the block I is excluded). However, two motion vectors in the prior interpolated frame (i.e., of two evaluation blocks disposed in a corresponding position of the current block in the prior interpolated frame) may be added to the seven candidate motion vectors.

If the weights are set for all evaluation blocks as described above, the filtering process is performed to obtain the motion vector using a predetermined operation. An example of the operation may include a vector median operation.

If N number of evaluation blocks and M number of candidate motion vectors are present (where M is less than or equal to N), the vector median operation calculates the differences (motion vector variation) between a candidate motion vector and the rest of the N−1 motion vectors, and calculates the sum of the differences to output the candidate motion vector having the minimum sum. Generally, a vector median operation does not use the weights. In contrast, the vector median operation according to aspects of the present invention uses various weights as shown in Equation 1. Here, the reference character $N_C$ is a set of candidate motion vectors, and the reference character $N_E$ is a set of evaluation motion vectors. $N_E$ may not be present.

$$\bar{v}_M = \underset{\bar{v} \in N_C}{\operatorname{argmin}} \left\{ \sum_{\bar{v}' \in N_C + N_E} w_B(\bar{v}') w_R(\bar{v}') \; w_T(\bar{v}') w_S(\bar{v}')(|\bar{v}'_x - \bar{v}_x| + |\bar{v}'_y - \bar{v}_y|) \right\}. \quad \text{Equation 1}$$

In Equation 1, $\bar{v}$ is a candidate motion vector, $\bar{v}'$ are evaluation motion vectors that include the candidate motion vector, $\bar{v}_M$ is the result of the vector median operation, that is a filtered motion vector of the current block, subscripts x and y indicate x-direction and y-direction, respectively, and $W_B$, $W_R$, $W_T$ and $W_S$ are various weights. Here, as shown in FIGS. 10 and 11, $W_B$ is a weight that is applied in consideration of the type and size of the block. The other weights $W_R$, $W_T$ and $W_S$ are selectively applicable.

First, $W_R$ is a weight that is set to be smaller if the reference distance (reference frame offset) from the frame that is referred by the corresponding block is increased. The weight is set by considering that if the reference distance is large, there is a greater possibility that the motion is different from the true motion.

Next, $W_T$ is a weight that is set depending on the temporal position where the frame of the corresponding block is present. As shown in FIG. 9, if blocks of at least one prior interpolated frame are considered in the filtering operation in addition to the blocks of the current interpolated frame, the weight is set to be smaller as the temporal position of the current interpolated frame becomes farther.

Finally, $W_S$ is a weight that is set on the basis of a position of a block in the kernel. $W_S$ may become smaller as the block becomes more distant from the center of the kernel. $W_R$, $W_T$ and $W_S$ may be set to depend on Gaussian distribution.

Figure 12:
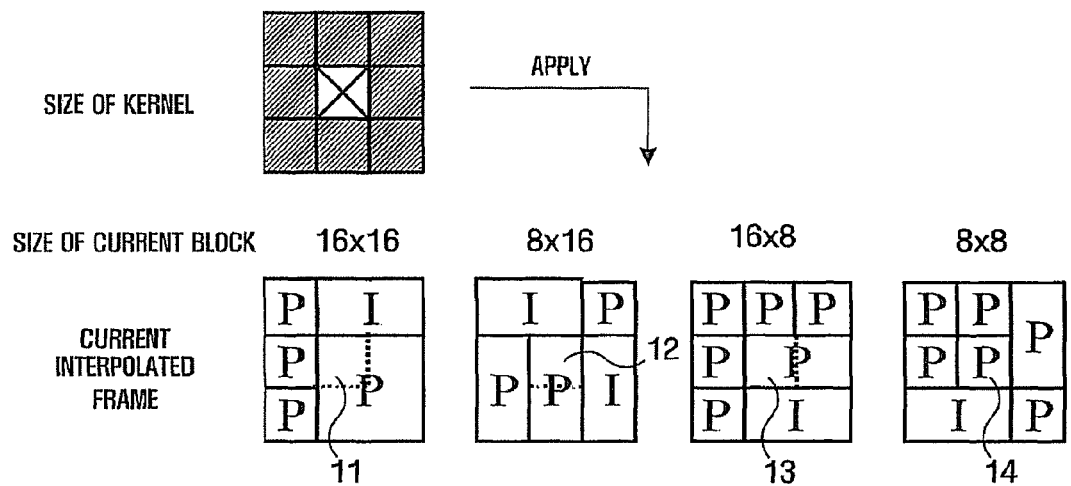
FIG. 12 is a diagram illustrating an example that uses a fixed kernel size.

Even though in the current embodiment (with reference to FIG. 9), the kernel size changes depending on the size of the current block, it is understood that the kernel size may be fixed. FIG. 12 illustrates an example of when the fixed kernel size is applied. Referring to FIG. 12, the kernel size is fixed to 24×24 pixels regardless of the size of the current block. Only $W_B$, which depends on the type and size of the block, is the same as in FIG. 10. In this embodiment, different motion vectors may be allocated to a single block (for example, 16×16, 8×16, 16×8, and 8×8 pixels) provided by the decoder 200. In FIG. 12, the motion filtering area for each block is represented by reference numerals 11 to 14.

Figure 13:
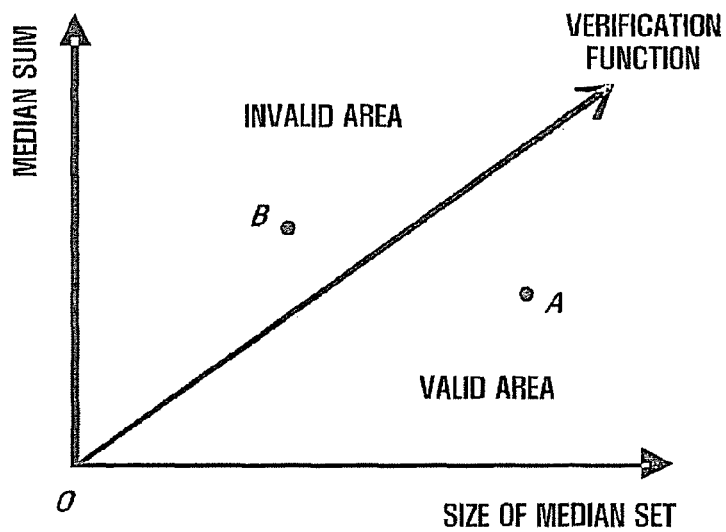
FIG. 13 is a graph illustrating a verification technique according to an embodiment of the present invention.

The motion vector verifying unit 340 verifies whether the motion vector filtered in the motion vector calculator 330 is valid or not. The reliability of the filtered motion vector depends mainly on the size of the vector median. FIG. 13 is a graph illustrating a verification technique according to an embodiment of the present invention. The verification function that is used in this embodiment is a linear function. The motion vector verifying unit 340 determines that if the median sum of the size of a specific median set is less than the verification function, the motion vector is valid. The median sum is a sum of the vector median operation obtained, for example, by Equation 1 (i.e., a result of the vector median operation). The size of the median set is the number of motion vectors (or number of blocks) that is used during the motion vector median operation as represented, for example, by Equation 1. In Equation 1, if the size of $N_C$ is equal to the size of $N_E$, the size of $N_C$ or $N_E$ is the size of the median set.

FIG. 13 illustrates an example of verifying the vector median operation. In FIG. 13, even though the verification function is a linear function, a different function may be selected therefor. The horizontal axis represents the number of predictive coded motion vectors in the current or prior motion field (i.e., the size of the median set that is used for vector median operation). The vertical axis represents a vector median sum. The vector median sum is available only if the size of a specific median set does not exceed the verification function.

The motion vector filler 350 determines a motion vector of a block that has an invalid motion vector (determined as such by the motion vector verifying unit 340), and replaces the invalid motion vector with the determined motion vector in the block. A method of performing a vector median operation of a predetermined size (for example, 3×3 kernel) on only valid motion vectors may be used to determine the motion vector for the block having the invalid motion vector.

The components of FIGS. 2, 5, and 6 may be implemented by software such as a task, class, sub routine, process, object, executing threads, and program that is executed in a predetermined area of a memory or hardware component such as a Field Programmable Gate Array (FPGA) or Application Specific Integrated Circuit (ASIC). Further, the components may be formed by the combination of the software and the hardware. The components may be stored in a computer-readable storage medium or distributed in a plurality of computers. Examples of the computer-readable recording medium include read-only memory (ROM), random-access memory (RAM), CD-ROMs, magnetic tapes, floppy disks, and optical data storage devices.

Each component may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

According to aspects of the present invention, a frame rate can be efficiently and quickly up-converted. Furthermore, aspects of the present invention may be appropriately applied to apparatuses having conditions such as low operation capacity, limited memory resources, and low power consumption.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for up-converting a frame rate of a decoded frame of a video stream by producing an interpolated frame using motion information from the video stream, the apparatus comprising:
a motion vector resampling unit to resample a motion vector for the interpolated frame by filtering a motion vector of a current block of the decoded frame using the motion information including evaluation blocks which include blocks that are disposed in corresponding position of the current block of the decoded frame of a prior interpolated frame in addition to the current block of the interpolated frame and adjacent blocks of the current block in the interpolated frame;
a motion compensating unit to compensate a motion of the decoded frame by the resampled motion vector in order to produce the interpolated frame; and
a switch to selectively output one of the decoded frame and the interpolated frame according to a sequential order of the decoded frame and the interpolated frame, wherein the motion vector resampling unit comprises a motion vector calculating unit to filter the motion vector of the current block using the motion vector of the current block and motion vectors of adjacent blocks of the current block in the decoded frame and a motion vector normalizing unit to normalize the motion vectors of the current block and the adjacent blocks by a reference frame offset,
wherein the motion vector calculating unit filters the motion vector of the current block by performing a vector median operation using the motion vector of the current block and the motion vectors of the adjacent blocks as inputs,
wherein if the motion vector calculating unit can not perform the vector median operation of two blocks, the motion vector of the two blocks having the smaller size is selected,
wherein the motion vector calculating unit applies weights to the current block and the adjacent blocks according to a size of the current block and respective sizes of the adjacent blocks
wherein the vector median operation uses the applied weights, and
wherein the vector median operation includes an equation:

$$\bar{v}_M = \operatorname*{argmin}_{\bar{v} \in N_C} \left\{ \sum_{\bar{v}' \in N_C + N_E} w_B(\bar{v}') w_R(\bar{v}') w_T(\bar{v}') w_S(\bar{v}') (|\bar{v}'_x - \bar{v}_x| + |\bar{v}'_y - \bar{v}_y|) \right\}$$

where M is a number of candidate motion blocks that may correspond to the filtered motion vector, $N_c$ is a set of candidate motion vectors $N_E$ is a set of evaluation motion vectors, $\bar{v}$ is a candidate motion vector of a candidate motion block, $\bar{v}'$ are evaluation motion vectors corresponding to the evaluation blocks, $\bar{v}_M$ is a result of the vector median operation, which is the filtered motion vector of the current block, subscripts x and y indicate x-direction and y-direction, respectively, and $w_B$, $w_R$, $w_T$ and $w_S$ are various weights.

2. The apparatus as claimed in claim 1, wherein the motion vector resampling unit further comprises:
a motion vector verifying unit to verify a validity of the filtered motion vector.

3. The apparatus as claimed in claim 1, wherein the motion vector resampling unit further comprises:
a block size regularizing unit to regularize the current block and the adjacent blocks to have at least a predetermined block size.

4. The apparatus as claimed in claim 3, wherein the block size regularizing unit combines blocks having a size less than the predetermined block size to create a representative block having a size that is greater than or equal to the predetermined block size.

5. The apparatus as claimed in claim 2, wherein the motion vector resampling unit further comprises:
a motion vector filler to replace a filtered motion vector that the motion vector verifying unit determines to be invalid with a motion vector that is determined to be valid.

6. The apparatus as claimed in claim 1, wherein the motion vector calculating unit applies the weights depending on positions of the current block and the adjacent blocks in a kernel during the vector median operation.

7. The apparatus as claimed in claim 6, wherein the motion vector calculating unit applies the weights depending on a reference frame offset of the current block and an offset of the adjacent blocks in the vector median operation.

8. The apparatus as claimed in claim 1, wherein the motion vector resampling unit further comprises a motion vector verifying unit to verify a validity of the filtered motion vector, such that if a median sum, corresponding to a result of the vector median operation, of a size of a specific median set, corresponding to a number of motion vectors used during the vector median operation, is less than a predetermined verification function, the motion vector verifying unit determines that the filtered motion vector of the current block is valid.

9. The apparatus as claimed in claim 1, wherein the motion vector calculating unit filters the motion vector of the current block using the motion vector of the current block, the motion vectors of the adjacent blocks, and motion vectors of blocks in a position of a prior interpolated frame corresponding to a position of the current block in the decoded frame.

10. The apparatus as claimed in claim 1, wherein the motion vector calculating unit applies a first weight to a first block and a second weight, less than the first weight, to a second block having a smaller size than the first block.

11. A method of up-converting a frame rate of a decoded frame of a video stream by producing an interpolated frame using motion information from the video stream, the method comprising:
resampling a motion vector for the interpolated frame by filtering a motion vector of a current block of the decoded frame using the motion information including evaluation blocks which include blocks that are disposed in corresponding position of the current block of the decoded frame of a prior interpolated frame in addition to the current block of the interpolated frame and adjacent blocks of the current block in the interpolated frame;
compensating a motion of the decoded frame by the resampled motion vector in order to produce the interpolated frame; and
selectively outputting one of the decoded frame and the interpolated frame according to a sequential order of the decoded frame and the interpolated frame, wherein the resampling of the motion vector comprises filtering the motion vector of the current block using the motion vector of the current block and motion vectors of adjacent blocks of the current block in the decoded frame and normalizing the motion vectors of the current block and adjacent blocks, included in the motion information, by a reference frame offset,
wherein the filtering of the motion vector comprises filtering the motion vector of the current block by performing a vector median operation using the motion vector of the current block and the motion vectors of the adjacent blocks as inputs, and
wherein if the vector median operation of two blocks can not be performed, the motion vector of the two blocks having the smaller size is selected,
wherein the filtering of the motion vector of the current block by performing the vector median operation comprises:
applying weights to the current block and the adjacent blocks according to a size of the current block and respective sizes of the adjacent blocks, the applied weights used in the vector median operation, and
wherein the vector median operation includes an equation:

$$\bar{v}_M = \underset{\bar{v} \in N_C}{\mathrm{argmin}} \left\{ \sum_{\bar{v}' \in N_C + N_E} w_B(\bar{v}') w_R(\bar{v}') w_T(\bar{v}') w_S(\bar{v}') (|\bar{v}'_x - \bar{v}_x| + |\bar{v}'_y - \bar{v}_y|) \right\}$$

where M is a number of candidate motion blocks that may correspond to the filtered motion vector, $N_C$ is a set of candidate motion vectors, $N_E$ is a set of evaluation motion vectors, $\bar{v}$ is a candidate motion vector of a candidate motion block, $\bar{v}'$ are evaluation motion vectors corresponding to the evaluation blocks, $\bar{v}_M$ is a result of the vector median operation, which is the filtered motion vector of the current block, subscripts x and y indicate x-direction and y-direction, respectively, and $w_B$, $w_R$, $w_T$ and $w_S$ are various weights.

12. The method as claimed in claim 11, wherein the resampling of the motion vector further comprises:
verifying a validity of the filtered motion vector.

13. The method as claimed in claim 11, wherein the resampling of the motion vector further comprises:
regularizing the current block and the adjacent blocks to have at least a predetermined block size.

14. The method as claimed in claim 13, wherein the regularizing of the current block and the adjacent blocks comprises:
combining blocks having a size less than the predetermined block size to create a representative block having a size that is greater than or equal to the predetermined block size.

15. The method as claimed in claim 12, wherein the resampling of the motion vector further comprises:
replacing a filtered motion vector that is verified to be invalid with a motion vector that is verified to be valid.

16. The method as claimed in claim 11, wherein the applying of the weights comprises:
applying the weights depending on positions of the current block and the adjacent blocks in a kernel during the vector median operation.

17. The method as claimed in claim 16, wherein the applying of the weights depending on the positions comprises:
applying the weights depending on a reference frame offset of the current block and an offset of the adjacent blocks in the vector median operation.

18. The method as claimed in claim 11, wherein the resampling of the motion vector further comprises:
verifying a validity of the filtered motion vector, such that if a median sum, corresponding to a result of the vector median operation, of a size of a specific median set, corresponding to a number of motion vectors used during the vector median operation, is less than a predetermined verification function, determining that the filtered motion vector of the current block is valid.

19. The method as claimed in claim 11, wherein the filtering the motion vector of the current block comprises:
filtering the motion vector of the current block using the motion vector of the current block, the motion vectors of the adjacent blocks, and motion vectors of blocks in a position of a prior interpolated frame corresponding to a position of the current block in the decoded frame.

20. The method as claimed in claim 11, wherein the applying of the weights comprises:
applying a first weight to a first block and a second weight, less than the first weight, to a second block having a smaller size than the first block.

21. A non-transitory computer readable recording medium encoded with the method of claim 11 and implemented by a computer.

22. An apparatus for up-converting a frame rate of a video stream by producing an interpolated frame using motion information from the video stream, the apparatus comprising:
- a decoder to decode a frame of the video stream and the motion information from the video stream;
- a motion vector resampling unit to resample a motion vector for the interpolated frame by filtering a motion vector of a current block of the decoded frame using the motion information including evaluation blocks which include blocks that are disposed in corresponding position of a current block of the decoded frame of a prior interpolated frame in addition to the current block of the interpolated frame and adjacent blocks of the current block in the interpolated frame;
- a motion compensating unit to compensate a motion of the decoded frame by the resampled motion vector in order to produce the interpolated frame; and
- a switch to selectively output one of the decoded frame and the interpolated frame according to a sequential order of the decoded frame and the interpolated frame, wherein the motion vector resampling unit comprises a motion vector calculating unit to filter the motion vector of the current block using the motion vector of the current block and motion vectors of adjacent blocks of the current block in the decoded frame and a motion vector normalizing unit to normalize the motion vectors of the current block and the adjacent blocks by a reference frame offset,
- wherein the motion vector calculating unit filters the motion vector of the current block by performing a vector median operation using the motion vector of the current block and the motion vectors of the adjacent blocks as inputs,
- wherein if the motion vector calculating unit can not perform the vector median operation of two blocks, the motion vector of the two blocks having the smaller size is selected,
- wherein the motion vector calculating unit applies weights to the current block and the adjacent blocks according to a size of the current block and respective sizes of the adjacent blocks, and
- wherein the vector median operation uses the applied weights, and
- wherein the vector median operation includes an equation:

$$\vec{v}_M = \operatorname*{argmin}_{\vec{v} \in N_C} \left\{ \sum_{\vec{v}' \in N_C + N_E} w_B(\vec{v}') w_R(\vec{v}') w_T(\vec{v}') w_S(\vec{v}') (|\vec{v}'_x - \vec{v}_x| + |\vec{v}'_y - \vec{v}_y|) \right\}$$

where M is a number of candidate motion blocks that may correspond to the filtered motion vector, $N_c$ is a set of candidate motion vectors $N_E$ is a set of evaluation motion vectors, $\vec{v}$ is a candidate motion vector of a candidate motion block, $\vec{v}'$ are evaluation motion vectors corresponding to the evaluation blocks, $\vec{v}_M$ is a result of the vector median operation, which is the filtered motion vector of the current block, subscripts x and y indicate x-direction and y-direction, respectively, and $w_B$, $w_R$, $w_T$ and $w_S$ are various weights.

23. The apparatus as claimed in claim 22, wherein the decoder comprises:
- an entropy decoder to perform lossless decoding on the video stream to extract the motion information and coded residual information;
- a dequantizer to dequantize the residual information by restoring a value that is matched to the residual information from an index using a same quantization table as a table used in a quantizing process;
- an inverse transformer to transform the dequantized residual information and restore the residual information by inversely performing a transforming process of an encoding process of the video stream; and
- a motion compensator to produce a predictive signal using the extracted motion information.

* * * * *